Aug. 16, 1960 R. KOMPFNER ET AL 2,949,558
HIGH EFFICIENCY VELOCITY MODULATION DEVICES
Filed Oct. 21, 1957 2 Sheets-Sheet 1

INVENTORS: R. KOMPFNER
C. F. QUATE
BY David P. Kelley
ATTORNEY

HIGH EFFICIENCY VELOCITY MODULATION DEVICES

Filed Oct. 21, 1957 2 Sheets-Sheet 2

INVENTORS: R. KOMPFNER
C. F. QUATE
BY David P. Kelley
ATTORNEY

United States Patent Office
2,949,558
Patented Aug. 16, 1960

2,949,558

HIGH EFFICIENCY VELOCITY MODULATION DEVICES

Rudolf Kompfner, Far Hills, and Calvin F. Quate, Berkeley Heights, N.J., assignors to Bell Telephone Laboratories, Incorporated, New York, N.Y., a corporation of New York Filed Oct. 21, 1957, Ser. No. 691,371
12 Claims. (Cl. 315—3.5)

This invention relates to high frequency electron discharge devices, and, more particularly, to those of the velocity modulation type.

High frequency velocity modulation type devices comprise, in general, a high frequency circuit in close proximity to which an electron beam is projected for interaction with wave energy on the circuit. One such device is commonly referred to as a traveling wave tube, wherein the beam is projected along a slow wave circuit a plurality of wavelengths long, and interaction takes place between the beam and a wave on the circuit over a substantial portion of this length. Another such device is commonly referred to as a klystron, wherein the beam is projected past one or more cavity resonators, and interaction takes place between the beam and wave energy within the resonators. In these and other types of velocity modulation devices, the interaction between the beam and the field in the high frequency circuit results in an interchange of energy and produces A.-C. components of electron velocity in the beam, some of the electrons being slowed down and others being speeded up which produces, in turn, bunching of the electrons in the beam. These bunches, in turn, interact with another portion of the same circuit or with a different circuit to produce amplification of the wave energy.

Such devices have proven to be capable of amplification and oscillation at exceedingly high frequencies, and have, in general, exhibited high stability, relatively low noise figures and, in the case of the traveling wave tube, exceedingly wide bandwidth characteristics. Despite the many significant advantages inherent in these devices, they have, in general, exhibited quite poor efficiencies, and much attention has been directed to increasing the efficiencies of these tubes.

Prior investigation into the underlying problems affecting the efficiency of traveling wave tubes, for example, has resulted in a reasonably good understanding of the theory of large signal amplification and agreement between this theory and experimental results. Accordingly, to a fair degree of accuracy, the R.-F. power output for a given tube design can be predicted. However, most of the work directed toward attaining higher efficiency in such tubes heretofore has been spent in an effort to maximize the radio frequency power output for a given value of D.-C. beam current and voltage on the slow wave circuit. This approach inherently results in a tube design characterized by a combination of electron beam and slow wave structure which has the highest possible value of the gain parameter C, also referred to as the circuit beam coupling parameter. Such an approach to obtaining high efficiency, namely, by seeking a maximum value of C, is not the most desirable way of solving the problems associated with high overall efficiency for every type of circuit application. Indeed, in a great number of cases it may be desired that a tube be designed having low values of the gain parameter C, such as in applications where amplifiers with extremely low noise levels are essential or where low power drain requirements are critical.

Another approach to the problem of increasing the efficiency of traveling wave tubes, for example, has been to decrease the D.-C. power input by lowering the voltage on the beam collector. Such efforts have not proved too successful because of the action of space charge forces in the beam and the velocity spread of electrons in the beam, that is, the difference in velocity between the slowest and fastest electrons, resulting from the interaction with a high-C circuit making it quite difficult to collect all of the electrons in the beam when the collector voltage is reduced.

It is an object of this invention to increase the overall efficiency of velocity modulation type devices.

Another object of this invention is to increase the efficiency of velocity modulation type devices without regard to and independently of the gain parameter C.

A further object of this invention is to produce high efficiency in velocity modulation devices while insuring maximum collection and minimum reflection of electrons in the beam.

In an illustrative embodiment of this invention, an electron discharge device of the traveling wave type comprises an evacuated enclosure having a slow wave circuit axially disposed therein, input and output circuits for applying a signal to be amplified to the slow wave circuit and for extracting the amplified wave therefrom, and electron gun and collector assemblies for projecting an electron beam past the slow wave circuit for interaction of the beam with the wave energy on the slow wave circuit.

In accordance with one feature of our invention, the collector comprises a multielectrode system, which, in certain embodiments includes two axially aligned apertured electrodes with a centrally aligned target adjacent the electrode furthest from the electron gun. In certain other embodiments, the electrode furthest from the electron gun is an integral part of the target. In either case, the collector assembly comprises two axially aligned and spaced electrodes of such configuration that a space charge region is established therebetween. Such a space charge region may be visualized as constituting a space charge cloud of electrons which set up a decelerating or repelling field near the target area of the collector. This field, in turn, limits the amount of current that may be collected for a given value of potential difference existing between the spaced electrodes of the collector. In this region the motion of the decelerating electrons is dependent upon the electrostatic fields which are established by specific potentials applied to the spaced electrodes of the collector. The two spaced electrodes are of such configuration and have such potentials applied thereto that an electrostatic field is established wherein the equipotential lines are always normal to the decelerating beam in the region of complete space charge before collection. Such a field configuration assures that the electrostatic forces are parallel to the electron paths of travel, whether the collector is designed for parallel or diverging flow before collection.

In accordance with another feature of this invention, the first electrode, nearest the electron gun, is spaced from the downstream end of the interaction circuit and positioned at a point in a drift region subsequent to the interaction circuit where the alternating current or electron velocity spread of the beam is a minimum. Hereinafter, for convenience, only the expression electron velocity spread will be used to define this characteristic of the beam. This particular placement of the collector, in accordance with the principles of this invention hereinafter described, permits the collector voltage to be reduced substantially below that normally required which heretofore has generally been greater than the potential on the slow wave structure of the traveling wave tube. Such a reduction in collector potential results in a considerable saving in the D.-C. power input, which, in turn, results in a higher overall efficiency for a given tube. For convenience, the expression downstream as used hereinafter will signify a closer proximity to the target electrode of the collector assembly than the electron gun with respect to a given reference point whereas the expression upstream will signify the converse.

In accordance with still another feature of this invention, the spaced electrode members of the collector are positioned at such a distance from each other that the D.-C. velocity of electrons in the beam is reduced to almost zero while the A.-C. velocity of the electrons remains substantially constant. The product of these two velocities, which, as will be apparent hereinafter, is determinative of the maximum efficiency obtainable, is accordingly reduced, permitting optimum efficiencies to be achieved. In addition, this particular spacing of electrodes advantageously prevents the occurrence of space charge blocking of electrons; that is, prevents a virtual cathode from being established by a zero electric field which would result in the electrons reversing direction before collection.

A complete understanding of this invention and of these and other features thereof may be gained from consideration of the following detailed description taken in conjunction with the accompanying drawing, in which.

Figure 1:
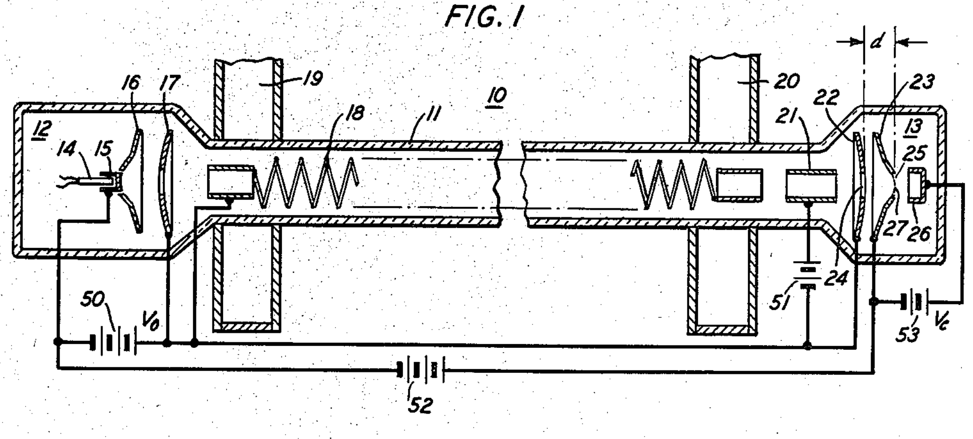
Fig. 1 is a schematic view of a traveling wave tube amplifier illustrative of one embodiment of this invention.

Referring now to Fig. 1, there is depicted a traveling wave tube 10 comprising an elongated, evacuated envelope 11, preferably of a nonmagnetic material, enclosing and supporting an electron gun structure 12 at one end for forming and projecting an electron beam along an extended path to a collector 13, described in detail below. The electron gun, as shown schematically, comprises a heater 14, cathode 15, beam forming electrode 16 and accelerating electrode 17. A conductive, helically wound, slow wave circuit 18 is axially disposed within envelope 11 for propagating an electromagnetic wave in coupling relation with the electron beam projected by the electron gun structure 12. Suitable input and output wave guide connections are schematically illustrated as 19 and 20, respectively, for launching a traveling wave onto helix 18 and extracting it therefrom in a manner well known in the art. It is to be understood that while a helix and wave guide connections have been shown in Fig. 1, any suitable slow wave interaction circuit and input and output connections may be utilized in accordance with the principles of the invention herein disclosed.

In between the output end of the slow wave circuit 18 and the collector 13 is a conductive sleeve 21 defining a portion of the drift region. Significantly, in passage through the drift region, the beam is characterized by regions of high and low electron velocity spread. In accordance with an aspect of this invention, described in detail below, the drift region is of such a length that the collector is positioned relative thereto at a point where the electron velocity spread of the beam is a minimum.

While the drift region is partially defined in Fig. 1 by sleeve 21, it is to be understood that in other embodiments this drift region may be defined solely by the inner periphery of envelope 11, or other suitable means.

Advantageously, in accordance with an aspect of this invention, the collector 13 basically simulates a modified electron gun in reverse. As depicted in Fig. 1, it includes a focusing electrode 22 and a decelerating electrode 23, having centrally aligned apertures 24 and 25, respectively. At least one of the spaced electrodes of the collector is disc shaped, or concave toward the interaction circuit so as to provide an electrostatic field region wherein the equipotential lines are always normal to the decelerating paths of electron flow. A curved grid 27 is placed across aperture 25 of electrode 23 so as to form an equipotential surface. A cup shaped conductive member 26 is aligned with aperture 25 to collect substantially all of the electrons of the beam. This cup shaped member 26 is illustrated as being isolated from electrode 23; however, in certain applications it may be desirous that they form one composite electrode member. While apertures 24 and 25 of electrodes 22 and 23, respectively, are illustrated as being of approximately the same diameter, it may be advantageous to increase the diameter of aperture 25 of electrode 23 substantially in certain applications where a diverging decelerating beam is desired. Such a structural modification is illustrated in various other embodiments described in detail hereinafter.

Electrodes 22 and 23 are so spaced that the electron velocity spread is reduced substantially below the minima that are attained along the drift region, as will be explained more fully hereinafter. The spacing with which we are concerned for the various collector embodiments described herein is the axial distance between an arc extending across that portion of the focusing electrode furthest downstream which forms the outer periphery of the aperture therethrough, and an equipotential surface at which the beam is at least partially collected, initially. The arc has a focal point on the axis which coincides with the center of curvature of the above-identified equipotential surface. This latter surface in the case of Fig. 1, is the center of the curved grid 27, upon which the beam is partially collected before reaching the cup shaped member 26. The total distance between the above-identified points is designated by the reference letter *d*, in Fig. 1. In the case of the various other collector assemblies described in detail hereinafter, this equipotential surface would comprise the outer surface of the various collector targets upon which the beam is completely collected, the distance *d* being measured to the respective centers thereof. The distance which the various collector embodiments disclosed herein are spaced from the downstream end of the interaction circuit is designated *l*, as defined in detail and used hereinafter, and is the distance at which the above-identified arc across the aperture of the focusing electrode for the various collector embodiments described herein is spaced from the downstream end of the interaction circuit. Hereinafter this distance will be referred to as the length of the drift region.

Considering the collector system 13 in operation, the first focusing electrode 22 is maintained at a positive potential with respect to the cathode, which may be the same potential that is applied to the slow wave circuit 18 in order to keep the beam confined before entering the decelerating space charge region between electrodes 22 and 23. The potential differences between the various elements can best be seen from the arrangement of the potential sources 50 through 53, the cathode potential being at zero reference level. The second decelerating electrode 23 of the collector is connected to potential source 52. The cup shaped member 26 is connected to a potential source 53 which makes it just slightly more positive than electrode 23 with respect to the cathode potential so as to attract substantially all of the electrons.

This potential constitutes the collector potential designated $V_c$ hereinafter, which, in accordance with the principles of this invention described below, may be reduced considerably below the helix potential normally required and still assure maximum collection of electrons. Any electrons that are reflected off of this surface are collected by the grid 27 and, hence, never impinge on other elements of the device which would result in excessive current drain as well as excessive generation of heat.

As will become apparent hereinafter, the combination of the structurally unique collector 13, together with the particular placement of this collector at a point where the electron velocity spread of the beam is a minimum, permits a greatly reduced collector voltage, thereby permitting the realization of maximum efficiency independent of the gain parameter C.

In order to better understand the principles of this invention, a theory which illustrates how a traveling wave tube amplifier may be designed for high efficiency independent of the gain parameter C will be considered utilizing the theory of linear operation first, followed by the determination of the proper placement of the collector and spacing of the electrodes for the various collector embodiments described herein so as to assure that maximum efficiency will be attained.

Since the beam at a current $I_o$ and at an average potential $V_o$ gives up energy to the R.-F. structure upon interaction with either an electromagnetic wave or a resonant system, the average potential must, therefore, decrease by an amount $\Delta V_o$, the beam energy shift, and thus, the R.-F. power output may be defined as follows:

$$P_{r\text{-}f}=\Delta V_o I_o \qquad (1)$$

Ideally, if all of the electrons traveled at the same velocity, we could decrease the collector potential $V_o$ to a value of $\Delta V_o$, and the electrons would be collected at zero velocity. Under this condition, the D.-C. input power would simply be the power supplied to the collector, namely, $I_o\Delta V_o$. This situation would result in efficiencies of 100 percent since the R.-F. power output would equal the D.-C. power input. As is well known, however, the electrons do not travel at the same velocity. Rather, the A.-C. components impressed upon the beam in flow past the interaction circuit result in some electrons traveling faster than the mean D.-C. beam velocity and some traveling slower. If all of the electrons are to be collected, this requires that the collector be at such a potential that the slowest electron is collected at zero velocity. This, in turn, means that all other electrons will be collected at a finite velocity and, hence, will give up energy in the form of heat. Accordingly, as a result of this spread in electrons, in terms of energy, the overall efficiency of velocity modulation devices heretofore has been considerably less than 100 percent, in fact, less than 15 percent for linear operation. It is to reduce this spread of electrons with which one aspect of the instant invention is concerned.

As known from a text by J. R. Pierce, entitled "Traveling Wave Tubes," Van Nostrand Company, 1950, page 138, the power output for linear operation of a traveling wave tube with a given A.-C. convection current $i$ for the electron beam may be expressed by the following relation:

$$P_{r-f}=\frac{1}{2}\left(\frac{i}{I_o}\right)^2 I_o V_o C\delta_1^4 \qquad (2)$$

where $i$ is the A.-C. convection current, $I_o$ the D.-C. beam current, $V_o$ the helix voltage, C the gain parameter and $\delta_1$ is the complex root of the propagation constant, as defined in the aforementioned Pierce reference on page 15.

In the electron stream at any given point between the end of the interaction circuit and the point of collection, the velocity of the electrons comprising the beam can be given by the expression $u+v$, where $u$ is the D.-C. beam velocity and $v$ is the A.-C. beam velocity. The electron energy of such a beam may be expressed in units of energy as follows:

$$\frac{m}{e}(u+v)^2\simeq\frac{mu^2}{e}+2\frac{m}{e}uv \qquad (3)$$

where $$\frac{m}{e}$$

is the ratio of the mass to charge constant which converts the expression for electron velocity into electron energy. Since the A.-C. velocity component $v$ by itself is very small for linear operation, it is neglected in the expanded form of Equation 3. The product $$2\frac{m}{e}uv$$

defines the electron energy spread of the beam with which we are particularly interested, and this product will be designated most often hereinafter as $\Delta U$ in connection with the theoretical analysis. Since the D.-C. beam energy component $$\frac{m}{e}u^2$$

is constant it does not affect the electron energy spread $\Delta U$ as defined herein and, therefore, does not enter into the following derivations.

With the principal part of the electron energy spread $\Delta U$, that we are concerned with clearly in mind, we may now specifically define the electron energy spread at the target of the collector assembly, described in detail hereinafter, by the following expression:

$$\Delta U_c=\frac{m}{e}u_c v_c \qquad (4)$$

The parameter $\Delta U_c$, as described in detail hereinafter is critically dependent upon the manner in which the beam is decelerated and, in turn, significantly affects the efficiency of a traveling wave device.

Having defined the relation between electron velocity spread $uv$ and electron energy spread $\Delta U$, we shall now consider the expression for and the manner by which the efficiency of a traveling wave device is substantially increased independent of the gain parameter C.

First, we shall rewrite Equation 4 in a more tractable form. It may be shown by the aforementioned Pierce reference on page 137 that the following relation exists for a traveling wave tube amplifier:

$$\frac{m}{e}u_o v_o=2V_o\frac{i}{I_o}\delta_1 C \qquad (5)$$

where $u_o$ and $v_o$ are the A.-C. beam velocities, respectively, at the end of the interaction circuit, the various other parameters being previously defined in Equation 2.

Equation 4 may now be rewritten in view of Equation 5 as follows:

$$\Delta U_c=2V_o\frac{i}{I_o}\delta_1 C\left(\frac{u_c v_c}{u_o v_o}\right) \qquad (6)$$

In order for the collector to collect the slowest electrons at zero velocity, the potential $V_c$ must be equal to the sum of the electron energy spread $\Delta U_c$ plus the electron beam energy shift $\Delta V_o$ as given by the expression:

$$V_c=\Delta U_c+\Delta V_o \qquad (7)$$

As previously mentioned, the power output $P_{r-f}$ may be given by the expression in Equation 1. The overall efficiency, as defined by the ratio of the power output $P_{r-f}$ to the power input $P_{d-c}$, is then given by the following relationship:

$$\eta_o=\frac{P_{r-f}}{P_{d-c}}=\frac{I_o\Delta V_o}{I_o V_c}=1+\frac{1}{\dfrac{I_o\Delta V_c}{I_o\Delta V_o}} \qquad (8)$$

where $V_c$ is the collector potential, assuming an ideal system wherein all of the current is collected by the collector.

By combining Equations 1 and 2, we can write:

$$I_o \Delta V_o = \frac{I_o V_o}{2}\left(\frac{i}{I_o}\right)^2 C\delta_1^4 \qquad (9)$$

and if we incorporate Equations 6 and 9 into Equation 8, we obtain:

$$\eta_o = \frac{1}{1+\frac{4}{\delta_1 3}\frac{I_o}{i}\left(\frac{u_c v_c}{u_o v_o}\right)} \qquad (10)$$

From Equation 10 it is apparent that a traveling wave tube may be designed for high efficiency in terms of well known basic tube parameters which are independent of the gain parameter C. It is also apparent that the efficiency is increased as the product $u_c v_c$ is decreased.

In order to increase substantially the efficiency for a minimum value of collector voltage $V_c$, applicants have found that there is an optimum point at which the collector should be spaced and positioned from the downstream end of the interaction circuit along a drift region. The determination of this region, which is where the electron energy spread $\Delta U$ is a minimum, for a linear amplifier so as to secure high efficiency independent of the gain parameter C will now be considered.

At the end of the drift region which follows the slow wave circuit of a traveling wave tube amplifier, there are two types of modulation impressed upon the electron beam, first, the A.-C. velocity, and second, the A.-C. current. These two parameters are defined in the Pierce reference previously cited, on page 142, and are rewritten herein in slightly modified form as follows:

$$\frac{v_1}{v_o} = \cos \beta_p l - \frac{\sqrt{4QC}}{\delta_1}\sin \beta_p l \qquad (11)$$

and $$\frac{i_1}{i_o} = \cos \beta_p l + \frac{\delta_1}{\sqrt{4QC}}\sin \beta_p l \qquad (12)$$

where $v_o$ is the A.-C. velocity and $i_o$ the A.-C. current at the end of the slow wave circuit, as defined on page 138 of the Pierce reference, and which are directly related as seen from Equation 5. The parameter $v_1$ is the A.-C. velocity and $i_1$ the A.-C. current at the end of a drift region of length $l$. The coefficient $\beta_p$ is the plasma phase constant in the drift region and $\delta_1$ is the first complex root of Pierce's propagation constant. By locating the focusing electrode of the collector at the end of the drift region, we can make use of the known Llewellyn-Peterson equations, which appear on page 240 of the aforementioned Pierce reference, to describe the A.-C. velocity, $v_c$, at the target area which results from both the A.-C. current $i_1$ and the A.-C. velocity $v_1$ at the focusing electrode of the collector. We can write an expression for the A.-C. velocity at the target area of the collector in accordance with Equation 5 of the Llewellyn-Peterson equations, as follows:

$$v_c = G^* I + H^* i_1 + I^* v_1 \qquad (13)$$

where I is the total current, convection plus conduction current, which is generally equal to zero for large transit angles. The coefficients G*, H* and I* are well known and defined in complex form on page 240 of the Pierce reference. Briefly explained, the coefficients G*, H*, and I* are expressible in terms of direct-current quantities previously defined in the art together with the frequency of the alternating current considered. For this reason, it is convenient to use the usual complex current notation employed in alternating-current theory so that the coefficient G*, for example, has the form and properties of a circuit impedance with both real and imaginary components.

Before proceeding with a determination of the proper length, $\beta_p l$ of the drift region which permits a minimum value of collector voltage $V_c$ to be utilized in practice, the manner in which the beam is to be decelerated before collection is significant and should be considered. Basically, the beam may be decelerated in either of two ways. One, it may be decelerated very rapidly within a short gap (sudden jump), or two, it may be decelerated slowly over a relatively long region. We can chose between these two systems by considering for the moment only the last term $I^* v_1$ in Equation 13. As previously established, and in accordance with an aspect of this invention, deceleration of the type which will decrease the ratio $$\frac{u_c v_c}{u_1 v_1}$$

which defines the ratio of the electron velocity spread at the collector to the spread at the beginning of deceleration is desired, as this parameter substantially affects the efficiency, as best seen from Equation 10. Normally, however, in prior collector designs, deceleration is very rapid, in fact, practically instantaneous. In terms of the Llewellyn-Peterson Equation 13 above, this means that there is no space charge, thus, it can be shown that I* is defined by the relation:

$$I^* = \frac{u_1}{u_o} \qquad (14)$$

where $u_1$ and $u_c$ are the D.-C. beam velocities at the end of the drift region and target, respectively. It should be noted that $u_o$ is equal to $u_1$ as defined herein since the D.-C. beam velocity does not decrease in the drift region.

It follows, in accordance with Equation 13 that for the sudden jump system of deceleration, $v_c$ may be given by the following expression:

$$u_c v_c = u_1 v_1 \qquad (15)$$

hence, the product $u_1 v_1$, the electron velocity spread is constant, since in the absence of space charge, $u_c = u_1$, and, therefore, does not afford a solution for increasing the efficiency in accordance with Equation 10.

However, in accordance with an aspect of this invention, if we decelerate the electron beam slowly over a relatively long region in accordance with the Child-Langmuir Space Charge Law, which identifies what is commonly known as a space charge limited region, it can be shown that $I^* = 1$. For this case, as seen from Equation 13 with only the last coefficient on the right side considered, $v_c$ is equal to $v_1$ and the ratio of the electron velocity spread at the collector to that at the beginning of deceleration may be rewritten as follows:

$$\frac{u_c v_c}{u_1 v_1} = \frac{u_c}{u_1} \qquad (16)$$

the ratio $$\frac{u_c}{u_1}$$

being much less than unity in accordance with the principles of this invention. As seen from Equation 10, with this ratio considerably less than unity, the efficiency of a velocity modulation device is substantially increased.

Accordingly, all of the coefficients of Equation 13 may now be easily evaluated, including the coefficient $H^* i_1$, in terms of space charge limited deceleration. By combining Equations 11 and 12 with Equation 13, considered in conjunction with the relationship between the A.-C. current $i$ and the A.-C. velocity $v$ given by Equation 5, the relation between the A.-C. velocity of the beam at the collector to that at the end of the interaction circuit may be given by the following expression:

$$\frac{v_c}{v_o} = \frac{\left[\cos \beta_{p1} + \frac{1}{\sqrt{2}}\sin \beta_{p1} + \frac{\sqrt{4QC}}{\delta_1}\left(\frac{1}{\sqrt{2}}\cos \beta_{p1} - \sin \beta_{p1}\right)\right]}{1+\frac{\sqrt{4QC}}{\delta_1}\sqrt{2}} \qquad (17)$$

where $\beta_p$ is the plasma phase constant in the drift region and $l$ is the length of the drift region, QC, the space charge parameter and $\delta_1$ is the first complex root of Pierce's propagation constant, which depends on the space charge parameter QC primarily.

To illustrate how a traveling wave tube amplifier may be designed for high efficiency independent of the gain parameter C, and the effect of properly positioning a collector, in accordance with the principles of this invention, the following curves will be beneficial.

Figure 2:
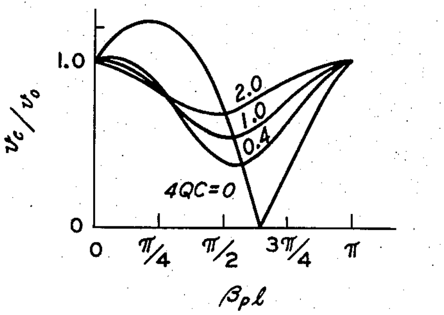
Fig. 2 is a graphic representation of the electron velocity spread of an electron beam in a drift region which is located at the output end of a traveling wave tube amplifier.
Figure 3:
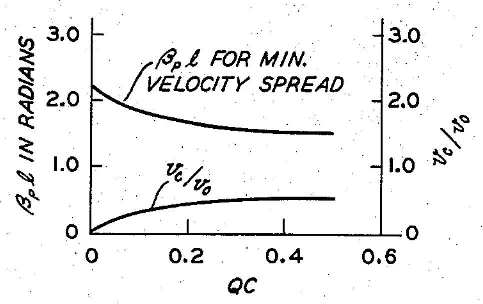
Fig. 3 is a graphic representation of the relative magnitude and location of a series of minimum electron velocity spread points of a beam in a drift region beyond the end of an interaction circuit of a traveling wave tube amplifier.

Fig. 2 illustrates a number of curves with different values of QC for the interaction circuit defined by the ratio of $$\frac{v_c}{v_o}$$

plotted along the ordinate versus $\beta_p l$, the distance in radians beyond the interaction circuit in a drift region plotted along the abscissa. These curves are derived from Equation 17. The most relevant information taken from these curves, namely, positions and values of the minima of this ratio for a series of space charge parameters are plotted along the ordinate in Fig. 3 with respect to the space charge parameter QC plotted along the abscissa.

The curves of Fig. 2 thus provide a positive way to determine the point at which to place the unique collector of our invention for high efficiency. By way of illustration, it is noted that putting the collector at the right point, say at $\beta_p l=1.90$ radians for $QC=0.1$, as seen from Fig. 3, will result in a reduction of the velocity spread by a factor of 3. This follows from Fig. 2 where we see that at $$\beta_{p1}=0,\ \frac{v_c}{v_o}=1,\text{ while at }=1.90, \beta_{p1}\frac{v_c}{v_o}=0.33$$

Thus, substituting these values into Equation 10, gives an efficiency approaching 40 percent at $\beta_p l=1.90$ radians and less than 20 percent at $\beta_p l=0$.

While the above analysis has been directed particularly to a forward traveling wave tube operating in the linear region, in accordance with the principles of this invention and the teachings therewith, similar derivations may be calculated by those skilled in the art for establishing the minimum electron velocity spread point for other velocity modulation devices, such as backward wave oscillators and klystrons. Similarly, while the above analysis has been directed to linear operation, in accordance with the principles of this invention and the teachings pursuant thereto, considerable improvement in efficiency independent of the gain parameter C can also be realized in velocity modulation devices operating in the nonlinear region. For this type of operation, efficiencies substantially greater than 60 percent are assured.

From the foregoing it can be seen that substantial increases in efficiency can be obtained by reducing the collector voltage and by positioning the collector at a point beyond the end of the interaction circuit where the velocity spread in the beam is a minimum, which materially aids in the collection of eletrons in the beam. To insure substantially complete collection of the beam, however, it is also necessary to properly space electrodes 22 and 23 of collector 13 in a region of substantially complete space charge.

Advantageously, since a space charge region is desirous for deceleration of the beam, as seen from the above analysis, the two electrodes of the collector are spaced apart, in accordance with an aspect of this invention, at such a distance that they establish a space charge limited region satisfying the Child-Langmuir Law referred to above. Under this condition, the D.-C. beam velocity $u$ decreases as the two-thirds power of distance, while the A.-C. beam velocity $v$ remains substantially constant intermediate the spaced electrodes. This concept has not been recognized or understood heretofore.

Since the A.-C. beam velocity remains substantially constant during deceleration, which is the condition for A.-C. velocity that we desire, the following analysis to determine the proper spacing of electrodes 22 and 23 may advantageously be considered in the light of only D.-C. beam velocity.

For space charge limited flow between parallel plates, it is known from the Child-Langmuir Law that the current $I_o$ reaching the anode may be given by the expression:

$$I_o=2.33\times10^{-6}\frac{V_m^{3/2}}{d^2} \quad (18)$$

where $I_o$ is the beam current, $V_m$ the potential difference between the parallel plates and $d$ the distance between the plates. Under this condition, the D.-C. beam velocity will theoretically approach zero velocity as the two-thirds power of distance.

From Equation 18, it follows that the electrode spacing of the collector embodiment depicted in Fig. 1 may be defined by the following relation:

$$d^2=2.33\times10^{-6}\frac{(V_o-V_c)^{3/2}}{I_o} \quad (19)$$

where $d$ is the distance between electrodes 22 and 23 of the collector as previously defined and illustrated, $V_o$ is the potential applied to accelerating anode 17 of the gun, to the slow wave structure, and to focusing electrode 22 of the collector and $V_c$ is the potential applied to the cup shaped member 26 of the collector. From Equation 19 it is apparent that the proper spacing between electrodes 22 and 23, namely, $d$, may be readily ascertained in terms of applied potentials to the various tube elements. Of course, a different potential could be applied to the slow wave structure and still be in accord with the principles of this invention. The potential $V_c$, applied to the cup shaped member 26, advantageously is at a potential considerably less than $V_o$ in accordance with a feature of this invention.

While the spacing of electrodes 22 and 23 has been considered for parallel flow only, the geometric and space charge relationships required for diverging or conical flow are well known, and the above analysis is equally applicable.

It should be pointed out that somewhere in the space charge limited region between the two spaced electrodes of the collector, the A.-C. beam velocity $v$ becomes comparable to the D.-C. beam velocity, and, at this point, electrons will start to overtake each other. Accordingly, when this point is reached, the electron velocity spread $u_c v_c$ can no longer be reduced. However, while this characteristic prevents efficiencies near 100 percent to be realized in practice, it certainly does not prevent efficiencies over 40 percent for linear operation and well over 60 percent for nonlinear operation to be realized in modulation devices designed in accordance with the principles of this invention.

While the theory and derivations thus far described have been considered in accordance with a collector assembly 13, as depicted in Fig. 1, other equally effective collectors in accordance with various embodiments of our invention may be utilized.

Figure 4:
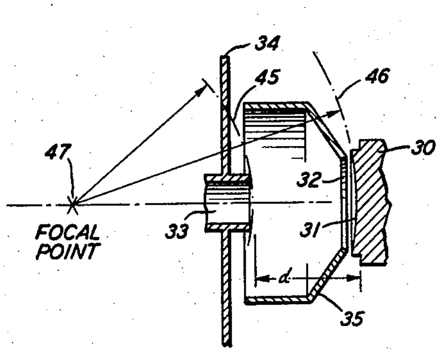
Figs. 4 through 7 are enlarged detail views in section of alternative collectors which embody the principles of this invention.

Fig. 4 illustrates an alternative embodiment of the collector of our invention wherein a solid graphite block 30 replaces the cup shaped member 26 and grid 27, depicted in Fig. 1. Since graphite has an extremely low secondary emission ratio, a relatively smooth spherical surface 31 assures substantially complete collection of the electrons. As also seen from Fig. 4, aperture 32 is considerably larger than aperture 33 to allow for collection of a diverging, decelerating electron beam, as well as a beam of parallel flow, in accordance with the principles of this invention. Apertured electrodes 34 and 35 are similar to those illustrated in Fig. 1, but of somewhat modified form.

Figure 5:
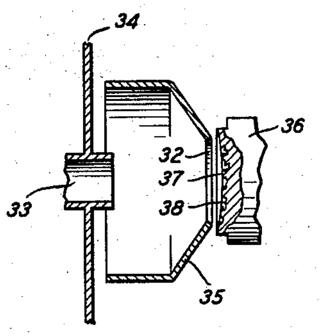
Figure 6:
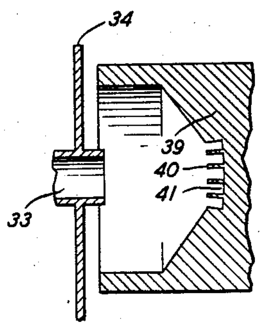
Figure 7:
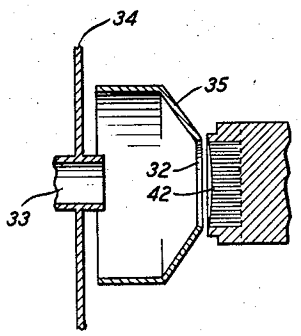

As previously mentioned, the axial distance $d$ referred to in Equation 19 for the collector assembly illustrated in Fig. 4, as well as those illustrated in Figs. 5 through 7, is measured axially between an arc 45 extending across that portion of the focusing electrode furthest downstream which forms the outer periphery of the aperture therethrough, and the equipotential surface 46 at which the beam is completely collected. The arc has a focal point 47 on the axis which coincides with the center of curvature of the above-identified equipotential surface. This latter surface comprises the outer surface of the various target areas illustrated in Figs. 4 through 7, the distance $d$ being measured to the respective centers thereof, as specifically illustrated in Fig. 4.

An additional modification of this novel collector assembly 13 is depicted in Fig. 5. In place of the cup shaped member 26 and fine wire grid 27, a tungsten block 36 is illustrated having its outer surface 37 characterized by a multitude of porous regions 38, such regions establishing zero equipotential lines of force. These regions prevent any reflected electrons from entering the space charge region between electrodes 34 and 35. Such a porous tungsten block could be constructed by initially mixing and pressing copper and tungsten powder into the desired shape, then heating this block to a very high temperature whereby the copper would evaporate leaving porous regions in the surface. Such a structure greatly reduces the possibility of secondary emission. Aperture 32 in Fig. 5, as in Fig. 4, is of larger diameter than aperture 33 so as to assure complete collection of a decelerating, diverging beam on the target surface area 37.

Fig. 6 illustrates another modified form of the collector 13 wherein the axially aligned electrode 39 forms an integral part of the target area 40 which has a plurality of circular grooves 41 to reduce the possibility of secondary emission for either parallel or diverging electron flow. These grooves establish zero equipotential regions much like those established in the porous surface depicted in Fig. 5. Of course, triangular grooves or other forms of serrated surface configurations would be equally effective. Elements identical to those previously described are designated by corresponding reference numerals.

Fig. 7 illustrates still another modified form of the collector 13, being quite similar to the target area of Fig. 5 but distinguishable therefrom in that the porous regions 42 of the target comprise a honeycomb grid. Such a structure may be constructed by known etching processes and provides an ideal surface for preventing secondary emission of electrons.

In order not to complicate the discussion pertaining to the principles of this invention, no mention has been made as to the effective circuit loss. Such loss will, undoubtedly, reduce the efficiency to an extent dependent on the actual specific structural design and type of operation of a given velocity modulation device. However, in the field of super high power tubes, and particularly in the lower microwave spectrum, circuit loss is usually negligible and efficiencies well above 50 percent for nonlinear as well as for linear operation may be realized.

It is to be understood that the specific embodiments described are merely illustrative of the general principles of the present invention. For example, higher efficiencies could easily be attained in other velocity modulation devices, such as backward wave oscillators and klystrons in particular, by utilizing a collector designed in accordance with the principles of this invention and positioned in a drift region where the electron velocity spread of the beam is a minimum.

What is claimed is:

1. A high frequency electron discharge device comprising an evacuated envelope, means forming an interaction circuit within said envelope, means for forming and projecting an electron beam within said envelope in coupling relation with said interaction circuit, said beam being characterized by regions of high and low electron velocity spread after passage through said interaction circuit, means downstream of said interaction circuit for collecting the electrons in said beam, said collecting means comprising a multielectrode system, the first electrode nearest said interaction circuit having a radially extending portion and apertured for passage of said beam therethrough and being positioned within said envelope such that the apertured portion furthest removed from said interaction circuit is within a region of minimum electron velocity spread, and means for biasing said first electrode with respect to a second electrode of said multielectrode system nearest said first electrode for establishing a space-charge-limiting region with equipotential lines extending in a direction normal to the decelerating paths of electron flow intermediate said electrodes.

2. A high frequency electron discharge device comprising an evacuated envelope, means forming an interaction circuit within said envelope, means for forming and projecting an electron beam in coupling relation with said interaction circuit, said beam being characterized by regions of high and low electron velocity spread after passage through said interaction circuit, means downstream of said interaction circuit for collecting the electrons in said beam with a drift region defined therebetween, said collecting means including a symmetrically aligned electrode system including at least two spaced electrodes, the opposed boundaries of at least one of said electrodes flaring toward said interaction circuit, the electrode of said two spaced electrodes nearest the interaction circuit being apertured for passage of said beam with the apertured portion furthest removed from said interaction circuit being positioned within a region of minimum electron velocity spread, means for applying potentials to said first and second spaced electrodes wherein a space-charge region is established with equipotential lines extending in a direction normal to the decelerating paths of electron flow intermediate said electrodes, and a substantially reflectionless collector target area axially aligned with said electrodes.

3. A high frequency electron discharge device comprising an evacuated envelope, means forming an interaction circuit within said envelope, means for forming and projecting an electron beam within said envelope in coupling relation with said interaction circuit, said beam being characterized by regions of high and low electron velocity spread after passage through said interaction circuit, means downstream of said interaction circuit for collecting the electrons in said beam and with the interspace therebetween defining a drift region, said collecting means comprising an axially symmetrical electrode system including a substantially reflectionless target area, first and second spaced electrodes with at least the first of said electrodes nearest the interaction circuit having a central aperture therethrough and in alignment with said reflectionless area, at least one of said spaced electrodes having a dished surface, and means for applying potentials to said electrodes wherein a space charge region is established with equipotential lines extending in a direction normal to the decelerating paths of electron flow intermediate said electrodes, said collecting means being positioned beyond the downstream end of said interaction circuit within a region of minimum electron velocity spread of the beam.

4. A high frequency electron discharge device in accordance with claim 3 wherein the spacing of said axially aligned first and second electrodes is determined by the relation:

$$d^2=2.33\times10^{-6}\frac{(V_o-V_c)^3}{I_o}$$

where $d$ is the axial distance between first and second arcs having a common focal point, the second of said arcs constituting the equipotential surface at which the beam is at least partially collected initially, the center of curvature of said surface on said axis determining the focal point of said first and second arcs, the first of said arcs extending across that portion furthest downstream of said first electrode which forms the periphery of said aperture therethrough, $I_o$ is the beam current and $V_o$ and $C_c$ are the potentials applied to said first and second electrodes, respectively, of the collector.

5. A high frequency electron discharge device in accordance with claim 3 wherein the substantially reflectionless target area comprises a graphite block having a curved surface.

6. A high frequency electron discharge device in accordance with claim 3 wherein the substantially reflectionless target area is an integral portion of the second of said electrodes with a plurality of circular grooves in said target area.

7. A high frequency electron discharge device in accordance with claim 3 wherein the substantially reflectionless target area is characterized by a plurality of porous regions in a solid metallic member.

8. A high efficiency traveling wave tube comprising an evacuated envelope, means defining an interaction circuit within said envelope, means for projecting an electron stream along said interaction circuit, and means for collecting said electron stream after passage along said interaction circuit, said last mentioned means including a focusing electrode and a decelerating electrode spaced such that the D.-C. beam velocity decreases as the two-thirds power of distance, at least one of said electrodes having a concave surface toward said interaction circuit, target means upon which said electron stream impinges, and means for applying potentials to said electrodes such that a space charge region is established with equipotential lines extending in a direction normal to the decelerating paths of electron flow intermediate said electrodes.

9. A velocity modulation device comprising an evacuated envelope, means for forming an interaction circuit for propagating an electromagnetic wave in field coupling relation with said beam, a drift region downstream of said interaction circuit wherein said electron beam is characterized by regions of high and low electron velocity spread, means downstream of said interaction circuit for collecting the electrons of said beam, said means including an axially symmetrical electrode system comprising a substantially reflectionless target area, a pair of electrodes spaced such that the D.-C. beam velocity decreases as the two-thirds power of distance and axially aligned with said reflectionless target area, at least one of said electrodes having a dished surface, and means for applying potentials to said electrodes for establishing a space charge region intermediate the spaced electrodes wherein equipotential lines extend normal to the decelerating paths of electron flow, said collecting means being positioned at a point beyond the downstream end of the interaction circuit where the electron velocity spread of the beam is a minimum.

10. An electron collector for velocity modulation devices comprising a target area having a substantially curved reflectionless surface, first and second spaced electrodes with at least the first of said spaced electrodes having a centrally aligned aperture with said target area and at least one of said electrodes having a dished surface, and means for applying potentials to said electrodes for establishing a space charge region wherein equipotential lines extend in a direction normal to the decelerating paths of electron flow, said electrodes being spaced at a distance such that the D.-C. beam velocity decreases as the two-thirds power of distance given by the relation:

$$d^2=2.33\times10^{-6}\frac{V_m^{3/2}}{I_o}$$

where $d$ is the axial distance between first and second arcs having a common focal point, the second of said arcs constituting the equipotential surface at which the beam is at least partially collected initially, the center of curvature of said surface on said axis determining the focal point of said first and second arcs, the first of said arcs extending across that portion furthest downstream of the first of said electrodes which forms the periphery of said aperture therethrough, $I_o$ is the beam current and $V_m$ is the potential difference between said first and second electrodes of the collector.

11. A high frequency discharge device comprising an evacuated envelope, means forming an interaction circuit within said envelope, means for forming and projecting an electron beam within said envelope in coupling relation with said interaction circuit, said beam being characterized by regions of high and low electron velocity spread after passage through said interaction circuit, means downstream of said interaction circuit for collecting the electrons of said beam, said collecting means comprising an axially symmetrical multielectrode system including a substantially reflectionless target area, a focusing electrode nearest the interaction circuit and a decelerating electrode spaced therefrom further downstream, and of which at least the focusing electrode has a central aperture in alignment with said reflectionless area, means for applying potentials to said spaced electrodes wherein a space-charge-limiting region is established with equipotential lines extending in a direction normal to the decelerating paths of electron flow intermediate said electrodes, the focusing electrode being positioned, from the downstream end of the interaction circuit where the electron velocity spread of the beam is a minimum, said distance also defining a drift region, and the spacing $d$ between the focusing and decelerating electrodes being determined by the relation:

$$d^2=2.33\times10^{-6}\frac{(V_o-V_c)^{3/2}}{I_o}$$

where $d$ is the axial distance between first and second arcs having a common focal point, the second of said arcs constituting the equipotential surface at which the beam is at least partially collected initially, the center of curvature of said surface on said axis determining the focal point of said first and second arcs, the first of said arcs extending across that portion furthest downstream of the focusing electrode which forms the periphery of the aperture therethrough, $I_o$ is the beam current, and $V_o$ and $V_c$ are the potentials applied to the focusing and decelerating electrodes, respectively, of the collector.

12. A high frequency electron discharge device in accordance with claim 11 wherein the substantially reflectionless target area is an integral part of said decelerating electrode.

References Cited in the file of this patent

UNITED STATES PATENTS 2,111,256 Warnecke ---------- Mar. 15, 1938
2,487,656 Kilgore ---------- Nov. 8, 1949
2,619,611 Norton et al. ---------- Nov. 25, 1952
2,853,641 Webber ---------- Sept. 23, 1958

FOREIGN PATENTS 932,443 Germany ---------- Sept. 1, 1955
777,979 Great Britain ---------- July 3, 1957